Oct. 5, 1965 P. M. DAVIES 3,210,739

STORAGE CIRCUITS FOR A SELF-SEARCHING MEMORY

Filed March 5, 1962 4 Sheets-Sheet 1

INVENTOR.
PAUL M. DAVIES
BY Lloyd Thompson AGENT
Fraser and Bogucki
ATTORNEYS

PAUL M. DAVIES
INVENTOR.
BY George C. Thompson AGENT
Fraser and Bogucki
ATTORNEYS INVENTOR.
PAUL M. DAVIES
BY George C. Thompson AGENT
Fraser and Bogucki
ATTORNEYS Oct. 5, 1965 P. M. DAVIES 3,210,739

STORAGE CIRCUITS FOR A SELF-SEARCHING MEMORY

Filed March 5, 1962 4 Sheets-Sheet 4

INVENTOR.
PAUL M. DAVIES
BY George C. Thompson AGENT
Fraser and Bogucki
ATTORNEYS United States Patent Office 3,210,739
Patented Oct. 5, 1965

3,210,739
STORAGE CIRCUITS FOR A SELF-SEARCHING MEMORY

Paul M. Davies, Manhattan Beach, Calif., assignor, by mesne assignments, to TRW Inc., a corporation of Ohio Filed Mar. 5, 1962, Ser. No. 177,666
4 Claims. (Cl. 340—173.1)

This invention relates to an information storage system and more particularly to a self-searching storage system employing superconductive elements in improved storage circuits.

Information storage systems are well-known in connection with electronic computers, data processing systems and the like. Such systems, or more accurately the particular portions thereof in which information storage is effected, are commonly referred to as memories in view of a property they share with the human mind in being able to store representations of particular applied information and to provide signals indicative of particular information upon request. Such memories may be broadly considered to be of two types: those in which information is stored in particular locations within the memory on either a random or an ordered basis and is retrieved by comparing each item stored in the memory with an identification key which is representative of the information that is sought, and those memories in which the storage section is divided into a number of discrete portions each of which bears an address that is used to locate a stored information item upon request. In most memories of the first type mentioned, information searching proceeds on a sequential basis so that on the average there are required half as many comparison operations as there are cells in the memory, thus rendering the retrieval operation both expensive and time consuming. Memory systems of the second general type eliminate the requirement that the entire memory be searched for a particular information item through the use of a memory section address which identifies the particular section of the memory in which an information item is stored. Thus all that is required is a search of the particular section identified by the address. However additional equipment is required in order to store and process the memory section addresses which are associated with the stored information items.

Information storage systems which present the advantages of both of the above mentioned systems without their inherent disadvantages are disclosed in my copending applications entitled "Improvements in Self-Searching Memory Systems," Serial No. 110,098, filed May 15, 1961, and "Self-Searching Memory Utilizing Improved Memory Elements," Serial No. 163,603, filed January 2, 1962. These systems belong within the first mentioned general class but attain a searching speed comparable with that of the second class by providing for a simultaneous comparison of a particular information item identification key with all of the information items stored within the memory.

The systems of the above mentioned copending patent applications employ pluralities of superconductive devices arranged in discrete memory circuits for the storage of individual information items and in associated control circuits which provide for the writing, readout, and clearing of information in the respective memory circuits. Each memory circuit and its associated control circuit comprise what is called a memory cell. Each memory circuit includes a number of "bit" storage stages, commonly referred to as bit stages, each of which has the capability of handling a binary digit, or bit of information. Information to be stored is applied to all of the memory circuits simultaneously but is written into a particular memory circuit as selected by the associated control circuit. Similarly a particular memory circuit is selected for the readout of information therefrom by the application of an identification key to all the memory circuits in parallel, after which that particular memory circuit which indicates a true comparison with the applied identification key is read out. It is not necessary that a comparison be achieved in each of the individual bit stages of the particular memory circuit which is to be selected by the applied identification key. All that is required is that the identification key be capable of selecting one or more memory circuits containing the information which is sought.

In many situations in which the present invention may be practiced to advantage, it is desirable to read out information from a plurality of memory circuits which may be selected by a non-unique identification key. An example of such a situation is in connection with the storage of records for a motor vehicle registration office. In such a case individual records may be uniquely defined in terms of license plate number, engine number, body number, or name and address of owner with the addition of further related information which is not necessarily so uniquely defined. Conversely the same records may be non-uniquely defined in terms of a portion only of a license plate number, the model and color of an automobile, or similar information which is desired to be capable of selecting a group of stored information items or records from various portions in the memory. In any event, the identification key signals are masked (i.e., withheld) from certain portions of the memory circuits in order that the information may be read out from the masked portions of those memory circuits which are selected. To accomplish this masking process in the above mentioned copending applications has required the provision of additional signalling leads and other circuitry which has increased both the number of individual devices required and the space needed for their storage.

It is therefore an object of this invention to provide an improved arrangement for a self-searching memory.

More particularly it is an object of this invention to provide an improved memory circuit having an enhanced capability for the masking of identification key signals applied to a self-searching memory.

It is a further object of this invention to provide an improved memory circuit suitable for operation with a reduced number of operative elements in a self-searching memory.

An additional object of this invention is the simplification of the circuitry employed in a self-searching memory.

In general this invention provides a self-searching memory system having information storage circuits in which a plurality of single control superconductor devices including a gated persistor circuit are arranged to facilitate the storage and readout of information. These single control superconductor devices are characterized by the use of only a single control current to determine the resistive state thereof, as contrasted with the dual control devices utilized in particular portions of the arrangements of the above mentioned copending application Serial No. 110,098. In particular, arrangements in accordance with the present invention reduce the number of leads which are required to control the operation of the information storage circuits and also permit the use of an improved method for the masking of certain identification key signals in the selection of particular memory circuits to be read out.

In circuits in accordance with the invention, binary coded information is stored as either the presence or absence of a circulating current in a gated persistor storage circuit and provision is made for the readout of information from particular storage stages of a selected memory cell in response to an applied identification key. The same storage circuit is applicable both for the storage of information and for the comparison of stored information with applied identification key signals. Arrangements in accordance with the invention thus permit the readout of selected information in response to an identification key in which certain of the selection signals have been masked. These arrangements provide for the superposition of a particular current level in those circuits in which masking is to occur upon the levels of currents which are applied in order to constitute the identification key signals, in effect disabling the masked circuits from providing any comparison therewith. Not only is a simplification of the associated control circuitry effected in accordance with this aspect of the invention, but the number of devices comprising an individual storage and comparison stage is advantageously reduced.

One particular arrangement of the invention utilizes a serial connection of the devices employed in the selection circuits of associated memory circuits. Another particular arrangement of the invention employs a plurality of superconductive devices arranged as storage and comparison elements to permit the readout of information from selected memory circuits in a predetermined sequence in order that a plurality of information items which correspond to an applied non-unique identification key may be read out one at a time.

A better understanding of the invention may be had from a consideration of the following detailed description, taken in conjunction with the accompanying drawings, in which.

Figure 1:
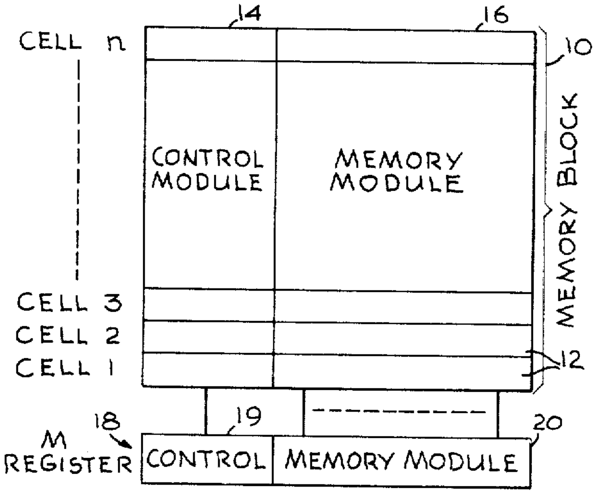
FIG. 1 is a block diagram of one particular information storage system including the present invention.
Figure 8:
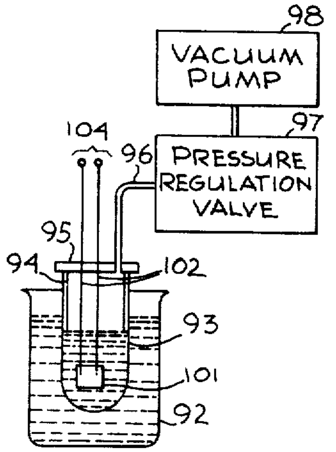
Figure 7:
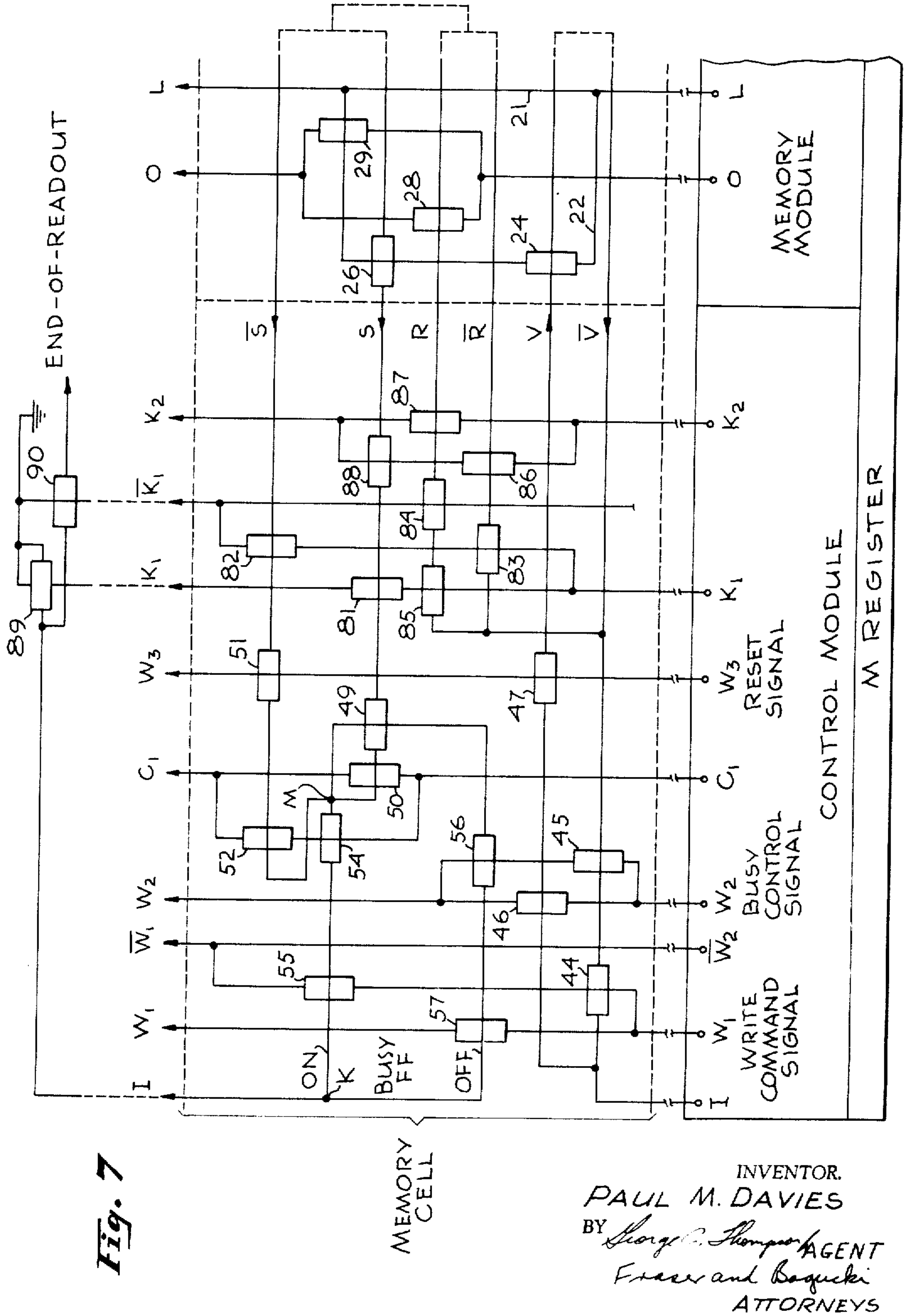

FIG. 7 is a schematic representation of an individual memory cell of the system of FIG. 1 illustrating a portion of the control circuit for permitting the sequential readout of stored information; and FIG. 8 is a diagrammatic representation of suitable apparatus which may be employed for maintaining superconductive structures used in the practice of the invention at a proper temperature of operation.

In order to present a better understanding of the invention a block diagram will first be discussed which is representative of a particular memory system in accordance with the invention. Referring now to FIG. 1, there is shown a memory block 10 comprising a plurality of individual memory cells such as the cells 12, each having the capacity to store a complete record or individual information item. Each memory cell 12 is divided into a control circuit and a memory circuit which are identified respectively as a control module 14 and a memory module 16. The memory module 16 is the portion of the memory cell 12 within which the information record is actually stored. Each memory module 16 is arranged so that a comparison can be provided between information stored therein and applied identification key signals and also so that particular output signals indicative of stored information can be generated when a selected cell is interrogated during the information retrieval process. Only those cells which provide a true comparison between the information stored therein and the applied identification key are selected to read out the selected information. The memory module portion 16 of each memory cell 12 comprises a number of storage stages. In general, identification key signals will be applied to only certain ones of the individual bit storage stages with the result that those remaining bit stages in the particular cell selected by the identification key are read out after the true comparison is effected.

The control module 14 includes circuitry for providing the desired control of the associated portions of a memory cell 12 including the steps of writing information, reading out information, indicating whether a particular cell 12 is available for information storage, controlling the sequence with which a cell is called upon to read out its stored information, and the like. Cooperating with the memory block 10 as a primary control is a single M register 18. As with the individual memory cells 12, the M register 18 is divided into a control module 19 and a memory module 20. Each of the control and memory modules of the M register 18 is connected respectively to corresponding control and memory modules in the individual memory cells 12 of the memory block 10. In storing information within the memory block 10, the information record is first stored temporarily in the memory module 20 of the M register 18 and then applied, together with appropriate control signals from the control module 19, to the memory block 10 where a first available memory cell 12 is selected to receive the information record in the manner which will be described in further detail below. Similarly in selecting information to be read out of particular memory cells 12 of the memory block 10, the identification key is temporarily stored in the memory module 20 of the M register 18, after which appropriate control signals from the control module 19 are applied to the memory block 10 to select the corresponding memory cell 12 and effect the readout of the desired information.

The memory system described herein possesses the capability of operating in response to masked key information. For example, portions of the key information which are masked will be ignored when the identification key is being compared with portions of the stored information in the memory modules 16 of the individual memory cells 12. Thus a particular identification key which is unique to an individual stored information record may be rendered non-unique and utilized in the selection of a plurality of stored information items of a class containing the uniquely identified information item simply by the masking of certain portions of the unique identification key. Furthermore, information may be cleared from those memory cells 12 containing information corresponding to a particular identification key simply by the application of a selective control signal from the control module 19 of the M register 18 which operates to change the state of an indicating device for this purpose contained within the individual modules 14 of the memory cells 12.

The invention will be described in terms of apparatus and circuitry comprising superconductive elements arranged for storage and control of information. Such elements are particularly suitable for use in the arrangements of the invention in view of their small size and low power requirements and also because of the high speed with which they may be switched between different storage states.

Before proceeding directly with the description of the remaining figures of the drawings, it may be well to briefly review the principles of operation of superconductive devices in order that the invention may be better understood. In the investigation of the electrical properties of materials at very low temperatures, it has been found that the electrical resistivity of certain materials experiences a discontinuity as the temperature of the material approaches absolute zero (0° Kelvin). In fact, for the materials employed in the devices described in the practice of the instant invention, the electrical resistivity becomes equal to zero below some critical temperature. Such materials have come to be known as superconductors, and the temperature at which the discontinuity in the resistivity curve occurs is known as the transition temperature. Recent developments have made it relatively simple to maintain electrical circuits including superconductive materials below the transition temperatures thereof so that the practical application of superconductive devices in electrical circuits becomes feasible. The peculiar property of superconductors, namely, that the resistance is zero in the superconducting temperature region, makes it possible for individual superconductive devices to be interconnected to perform logical functions in data processing systems and digital computers. Furthermore, since the devices may be fabricated of extremely thin material layers of the order of a few hundred Angstrom units in thickness, it can be seen that an individual device may be of very small size. In addition, since the device is operated principally in the region of superconductivity, current flowing therein when the device is superconducting dissipates no power. Accordingly, superconductive devices become extremely attractive for use in a complex system, such as a digital computer, wherein extensive circuits involving the interconnection of a large number of such devices may be operated wtih extremely low power requirements.

It has been found that the transition point, i.e. the point at which a given material changes between superconductive and normally resistive states, is a function of both temperature and applied magnetic field with the transition temperature changing as the applied magnetic field is varied. With a magnetic field applied, the temperature at which suprconductivity begins for a given material is lowered, and furthermore this temperature decreases as the intensity of the magnetic field is increased. Therefore it can be seen that a superconductive material may be switched into and out of the superconducting region by maintaining the temperature of the material slightly below the zero magnetic field transition temperature and by varying the applied magnetic field above and below some threshold value applicable for that temperature. This phenomenon suggests that the presence of a current existing in a superconductor may be detected by the application of a particular magnetic field above the threshold value for the temperature at which the superconductor is maintained in order that current flowing therein may produce a voltage drop that can be observed. Thus superconductive devices may be employed to perform a variety of functions required for computer operation, as for example information storage, circuit current control, and the like.

It should be noted that the flow of electric current within a superconductor also generates a magnetic field which, when combined with any externally applied magnetic field, determines whether the threshold field value is exceeded. It will be appreciated that the magnetic field arising from the flow of current in one superconductor may be applied to a second superconductor to exceed the threshold field value thereof and thereby cause the second superconductor to switch from the superconductive region to a region of normal electrical resistance. Thus it will be clear that one superconductor device carrying a current of a value sufficient to generate a magnetic field exceeding the threshold value of a second device may be employed to control the resistive state of the second superconductive device.

For the purposes of the present application, the term "superconductive material" will be understood to mean a material which loses all measurable resistance to the flow of electrical current for temperatures below some specified value of critical temperature. A few of these materials and the corresponding transition temperature at which the material changes from a normally resistive state to a superconductive state are listed below:

| | Degrees Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.3 |
| Thallium | 2.4 |
| Aluminum | 1.2 |
| Titanium | 0.5 |

In addition to the materials listed above, other elements as well as many alloys and compounds have been found to exhibit superconductive properties at temperatures ranging between 0° and 17° Kelvin. For a more complete discussion of this subject, reference is made to a book entitled "Superconductivity" by D. Schoenberg, Cambridge University Press, Cambridge, England (1952).

The above listed transition temperatures apply only when the materials are in a substantially zero magnetic field. In the presence of a magnetic field, the transition temperature is decreased so that a given material may be in an electrically resistive state even for temperatures below the specified transition temperature at which the material would be superconductive in the absence of a magnetic field.

Inasmuch as a magnetic field may arise from a current flowing in a superconducting material itself, the material may be considered to have a critical value of electric current as well as a critical value of magnetic field which will switch the material from a condition of superconductivity to an electrically resistive condition. Accordingly when a material is held at a temperature below the normal transition temperature for a zero magnetic field, the superconducting condition of the material may be extinguished by the application of a magnetic field which may originate from an external source or may be internally generated through the flow of current within the material.

Figure 2:
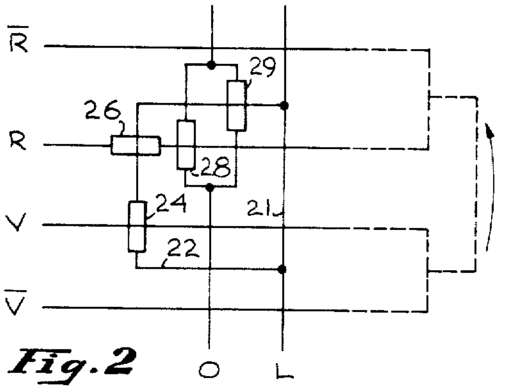
FIG. 2 is a schematic representation of one particular memory circuit arrangement in accordance with the invention for use in the system of FIG. 1.

Referring now to FIG. 2 there is shown one specific arrangement of a memory circuit in accordance with the invention utilizing a plurality of cryogenic devices exhibiting the characteristics just discussed. The basic storage circuit in the arrangement of FIG. 2 is a gated persistor comprising the parallel paths 21 and 22 and having a superconductive device 24 in series with the path 22. Together the paths 21 and 22 comprise a closed superconductive loop for the storage of a circulating current. Once a circulating current is established in such a closed loop, the current continues to flow undiminished for an indefinite period but may be terminated by the application of a current to the V lead sufficient to render the device 24 resistive. The circulating current may be initiated or terminated in accordance with applied information signals so that the circulating current may be employed to represent stored information in binary code. Although both of the paths 21 and 22 contain a certain amount of inductance, the persistor loop can be more easily understood if the path 21 is thought of as the inductive branch and the path 22 is considered either superconductive or resistive by virtue of the device 24 which is controlled by current in the V lead.

In order to accomplish the selection or non-selection of respective memory cells as desired, a single gating device 26 is provided in conjunction with the basic persistor storage loop comprising the paths 21 and 22. In accordance with the invention this single device 26 is arranged to provide a comparison between a stored bit of information and an applied identification key signal and, further, to disregard such a comparison in response to selectively applied masking signals. The operation of this portion of the invention will be described in further detail below.

In the arrangement of the invention shown in FIG. 2, a binary "1" is represented by a circulating current in the persistor loop whereas a binary "0" is represented by the absence of current therein. A binary "1" may be stored by the application of a writing current to the L lead. While the direction is immaterial, let it be assumed that this writing current for a binary "1" is directed upwardly along the L lead. In the particular cell in which information is to be written, a control current is directed along the V lead, thus rendering the device 24 resistive. In those storage circuits which do not experience a control current in the V lead, current in the L lead divides between the paths 21 and 22 in inverse relationship to the respective inductances thereof. Thus when the current in the L lead is terminated, the corersponding currents in those paths 21 and 22 also terminate. However, in those circuits in which the path 22 was rendered resistive by virtue of a control current in the V lead connected to the device 24, the current in the L lead is directed along the path 21. Prior to termination of the writing current in the L lead, the control current is diverted from the V lead to the $\overline{V}$ lead, thus permitting the device 24 to become superconductive again. Upon the termination of the writing current in the L lead, the inductance of the path 21 maintains a particular level of current which is directed to flow around the loop comprising the paths 21 and 22. In this particular arrangement of the invention, the magnitude of the circulating current is established at a value which is equal to 4/3 the critical current $I_c$ for the superconductive devices of the circuit.

The dashed lines at the right-hand side of FIG. 2 are used to indicate that the V and $\overline{V}$ leads are connected in parallel and that current over one or the other of these leads is returned over the parallel combination of the R and $\overline{R}$ leads. The return current is caused to flow in the R lead by the associated control circuit, to described later, unless it is blocked by the resistive states of devices such as the superconductive device 26. During the writing process current is directed from the associated control circuit along the V lead. During other operations, such as the comparison and readout processes, the current is directed along the $\overline{V}$ lead. It has already been mentioned that the circuit shown in FIG. 2 is employed as a bit storage stage in the memory module of a memory cell and is arranged to function both as a comparison circuit in response to identification key signals from the M register and as a readout circuit to return to the M register an indication of the information state of the circuit.

During the comparison of stored information with identification key signals from the M register, the identification key signals are applied to the L leads in the same fashion as the signals applied during the writing process. During the comparison process, the device 26 is to be rendered resistive only if the particular information bit stored in the associated persistor does not match the information signal transmitted via the L lead. A binary "1" is represented by a current in the L lead in the same direction as in writing, whereas a binary "0" is represented by the absence of current in the L lead. The following Table I shows four possible states of the circulating persistor current, Ip, the transmitted current in the L lead, $I_L$, and the resulting current, $I_r$, in the path 22 of the persistor.

*Table I*

| $I_p$ | $I_L$ | $I_r$ |
|---|---|---|
| 0 | 0 | 0 |
| 0 | 1 | 1 |
| 1 | 0 | 1 |
| 1 | 1 | 0 |

In order for the circuit to operate as indicated by Table I, the inductance of the paths 21 and 22 and the magnitude of the circulating current $I_p$ are arranged to be such that the portion of the current $I_L$ which is directed through the path 22 is equal in magnitude to $I_p$. These two currents are, however, oppositely directed in the path 22 so that, in effect, they cancel each other out in this path. This provides the resulting binary values of the current $I_r$ shown in Table I and it follows that the device 26 is resistive only in the case where the transmitted and stored information states are different.

Figure 3:
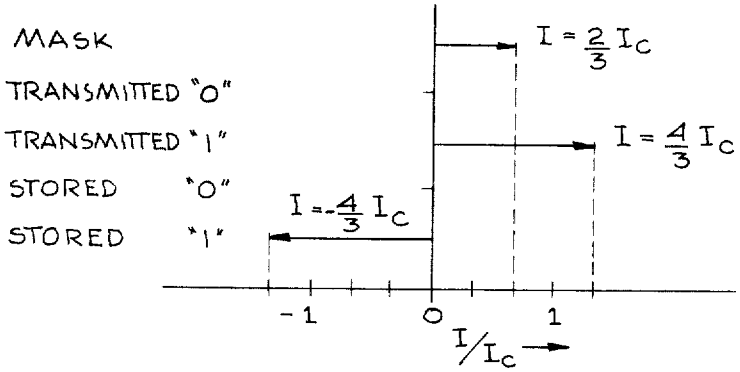
FIG. 3 is a graphical representation of currents employed in the operation of the circuits of FIG. 2.

A graphical representation corresponding to the current values shown in Table I may be found in FIG. 3. This graphical representation, which is a plot of a ratio of the value of current to the critical current value for the respective storage and key identification signal states, shows the respective currents as they appear in the path 22 of FIG. 2. A positive current corresponds to current flowing in a clockwise direction whereas a negative current corresponds to that flowing counter-clockwise in the path 22. Thus a stored binary "1" is represented by a negative current and, as has already been indicated, is arranged to have a magnitude equal to $\frac{4}{3}I_c$. Similarly a current in the path 22 corresponding to a binary "1" transmitted via the L lead is represented by a positive current equal to $\frac{4}{3}I_c$. A stored binary "0" corresponds to the absence of a circulating current whereas a transmitted binary "0" corresponds to the absence of current in the L lead. When a transmitted binary "1" matches a stored binary "1," the currents are of equal magnitude but oppositely directed so that the net effect is a zero current in the path 22. Similarly when a transmitted binary "0" matches a stored binary "0" the resultant current is zero. Only in the case of a mismatch between the stored circulating current and the transmitted current value is there current in the path 22. In such a case this current has a magnitude of $\frac{4}{3}I_c$. This exceeds the critical current value of the device 26, so that when a mismatch occurs the device 26 is driven resistive and the current which might otherwise flow in the R lead is directed to the $\overline{R}$ lead.

When an identification key is to be applied to the storage system of the invention, it is generally desired to select particular bit stages in which applied identification key signals and the stored information states are to be compared. In the remainder of the bit storage stages it is desired to have the device 26 maintained superconductive, irrespective of the result of the comparison between the stored circulating current and the identification key signal applied to the L lead. In other words, it is desired that certain of the stages be masked on a selective basis so that only particular bit storage stages are effective in making the comparison with the identification key in order that one or more memory cells may be selected for readout.

The desired result is achieved in accordance with an aspect of the invention by applying a masking current equal to $\frac{2}{3}I_c$ to the L leads of those stages which are desired to be masked. As a consequence, the combination of this masking current with the stored current state, whether a binary "0" or a binary "1," produces an effective current in the path 22 which permits the device 26 to be superconductive. Referring again to FIG. 3, it can be seen that the combination of a masking current with a stored binary "1" results in a net current equal to $-\frac{2}{3}I_c$. On the other hand, the combination of a masking current with a stored binary "0" results in an effective current equal to $+\frac{2}{3}I_c$. Since the device 26 is responsive to the magnitude of current only, it remains superconducting for either of these resultant currents because both are below the critical current value.

In applying an identification key to a number of circuits such as that in FIG. 2, masking signals equal to $\frac{2}{3}I_c$ are first applied to all L leads. This assures that the gates 26 of all circuits are superconductive and the control current is then switched into the R lead. Thereafter identification key signals are transmitted via the L leads which are not to be masked while the remaining L leads continue to carry the masking signals. Wherever a mismatch between transmitted and stored information occurs, the control current is switched from the R to the $\overline{R}$ lead, and only those memory cells in which current remains in the R lead are selected to be read out. It will be noted that the present invention advantageously achieves the writing of information, the comparison of stored information with identification key signals, and the selective masking of key signals in response to appropriate corresponding signals, all applied via the L lead. Thus a significant reduction in the quantity and complexity of associated devices and circuitry is achieved. By virtue of this aspect of the invention the comparison step to provide the selection or non-selection of the respective memory cells in response to an applied identification key is made possible by the addition of a single gating device to the basic persistor storage loop. As described, this comparison gating device is capable of responding to an applied identification key signal and to an applied masking signal in accordance with the invention to perform the functions outlined hereinabove.

Stored information from the selected memory circuits is read out after the comparison process by the application of signals to the O lead. In each memory circuit such as the one shown in FIG. 2, the O lead is divided into two paths, one of which includes a superconductive device 28 controlled by current in the R lead and the other of which includes a superconductive device 29 which is controlled by current in the persistor loop. In those memory circuits in which current has been diverted to the $\overline{R}$ lead as the result of a mismatch between an applied identification key signal and the information state stored in a particular memory cell, the device 28 is superconductive and the signal applied to the O lead is permitted to bypass the device 29. Only in the stages of the memory cell selected for readout as a result of the identification key comparison is current left flowing in the R lead, thus driving the device 28 resistive. As a result, the signal in the O lead is directed to the device 29 to sense the condition of the circulating current in the associated persistor loop. If a stored current is circulating therein, the device 29 is resistive and an appropriate voltage drop across the device 29 is developed to indicate a stored binary "1." On the other hand, if there is no circulating current in the persistor loop, corresponding to a stored binary "0," the device 29 is superconducting and the resulting absence of a voltage drop in response to the readout signal applied to the O lead serves to indicate a stored binary "0."

Figure 4:
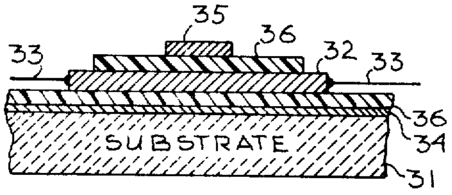
FIG. 4 is a cross-sectional view of a superconductor control element employed in the present invention.

A cross-sectional view of a superconductive device which may be employed in the circuits of this invention is represented in FIG. 4 wherein a substrate 31 is shown to which is affixed a superconductive layer 32. A ground-plane 34 is shown plated on the substrate 31 under the layer 32 and insulated therefrom. The ground-plane 34 is of a suitable superconducting material and serves to reduce the inductance of the device. The substrate 31 may be of glass or any other suitable insulator appropriate for this purpose. The superconductive layer 32, employed as a gate element in the device of FIG. 3 is shown with leads 33 attached to opposite ends thereof. A second superconductive layer 35, employed as a control element to determine the particular state of the associated gate element, is deposited over the layer 32 at right angles and separated therefrom by a thin layer of insulation 36. The relative dimensions of the cross-sectional representation of FIG. 4 are not to be taken as determinative of the actual dimensions of a particular device. Rather, it will be understood that the layers are very thin, of the order of a few hundred Angstrom units in thickness, so that an individual fabricated device is very small in size. Because of the very small size, a large number of these devices can be fabricated within a small space and operated at relative low current levels, by virtue of which magnetic fields from currents in the control element 35 may exert the desired influence on the condition of the gate element 32 in order to switch the gate element 32 to the resistive state as desired.

Figure 5:
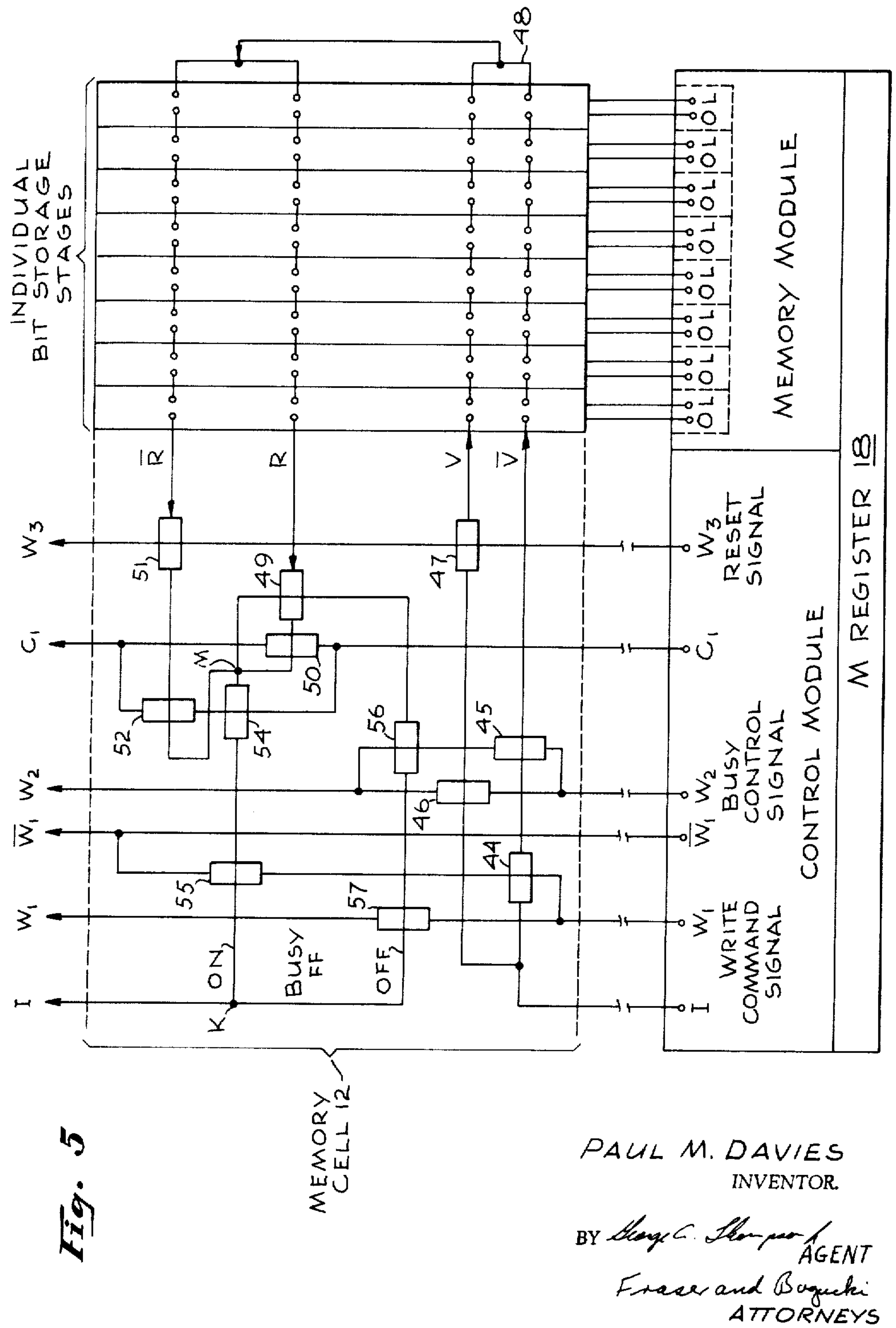
FIG. 5 is a schematic representation of a control circuit employed in the system of FIG. 1.
Figure 6:
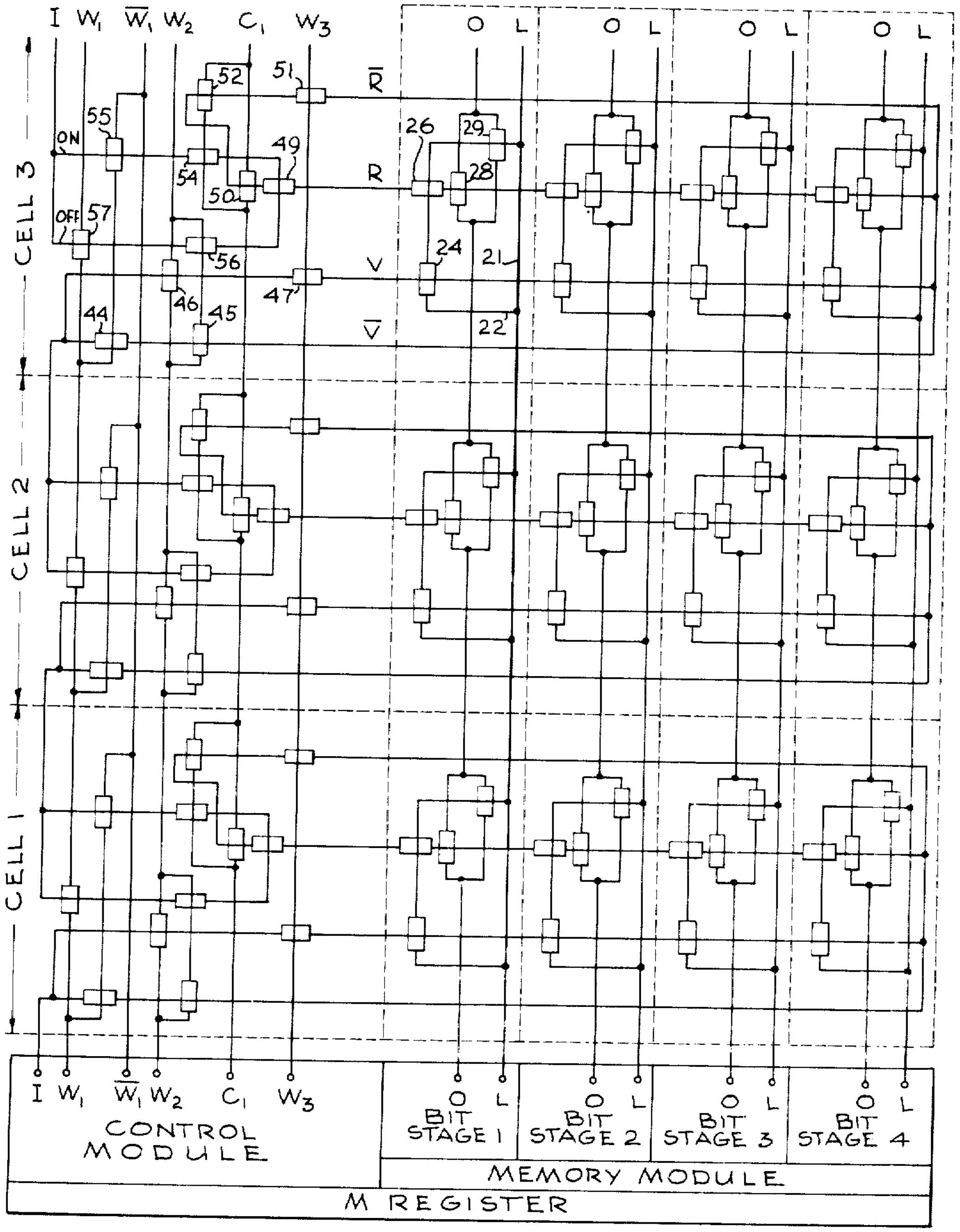
FIG. 6 is a schematic representation of a portion of the information storage system of FIG. 1.

Reference is now made to the diagram of FIG. 5 in order to explain the control portion of an individual memory cell of the memory block 10 of FIG. 1. FIG. 5 represents an individual memory cell 12 together with appropriate connections to the associated M register 18. The control portion of the memory cell 12 is represented schematically while the rectangles corresponding to the individual bit handling segments or stages may be understood to contain particular information storage circuits as were discussed in connection with FIG. 2, for example. In the circuit of FIG. 6, a D.C. current is continuously applied to the I lead from the control module of the M register. As this current proceeds through the memory cell it is directed through either the V or $\overline{V}$ leads, which are in parallel, thence to the node 48 after which the current flows in either the R or $\overline{R}$ leads, which are also in parallel with each other, to the point M. From the point M there are again two parallel paths, the ON lead and the OFF lead of a circuit which is designated the BUSY flip-flop. These parallel leads are joined again at the point K from which current flows again in the I lead to the next memory cell. The BUSY flip-flop is used to provide an indication of the storage state of the associated memory module. Current in the ON lead indicates that information is stored in the associated memory module while current in the OFF lead indicates that the associated memory module is available for the storage of information. In addition to the current in the I lead from the M register, control signals in the form of pulses may be applied to the $W_1$, $W_2$, $C_1$ and $W_3$ leads as will be described. It should be remembered that the signal on the $W_3$ lead is a reset signal and will have been applied prior to each particular operation of writing, readout or clearing of information from the respective memory cells. A reset current applied to the $W_3$ lead drives the devices 47 and 51 to the resistive state. Thus during each reset signal, current is blocked from the V lead connected to the device 47 and from the $\overline{R}$ lead connected to the device 51.

In considering the sequence of operations of the circuit of FIG. 5, it may be borne in mind that the corresponding pairs of leads, V and $\overline{V}$, R and $\overline{R}$, are separately concerned with the steps of writing, selecting and reading information in appropriate memory cells. Thus only one pair of leads need be considered for a given control operation. In the writing operation, a particular memory cell will be selected only if its BUSY flip-flop is in the OFF condition and if it happens to be the closest available memory cell to the M register. For the purposes of explanation, let it be assumed that the memory cell shown in FIG. 5 corresponds to these particular conditions.

A write command signal applied to the $W_1$ lead produces current flowing toward the memory cell of FIG. 5 where it is presented with two possible paths. In those memory cells where the BUSY flip-flop is in the ON condition, the device 55 is rendered resistive and thus blocks the current on the $W_1$ lead from flowing to the $\overline{W}_1$ lead. However, in the memory cell of FIG. 5, which represents the first available memory cell, the BUSY flip-flop is in the OFF state so that current in the OFF lead drives the device 57 resistive, thus directing current to flow from the $W_1$ lead through the control element of the device 44 and through the device 55 to the $\overline{W}_1$ lead. This drives the device 44 resistive and switches current from the $\overline{V}$ to the V lead in order to effect the writing of the information applied from the memory module of the M register into the information storage circuits of the individual bit handling stages in accordance with the procedure already described with reference to FIG. 2. Immediately following the write command signal on the $W_1$ lead, a busy control signal is applied to the $W_2$ lead. This signal current encounters the device 46 in a resistive state as the result of current flowing through its control element in the V lead. In consequence, the busy control signal current is directed through the device 45 and the control element of the device 56, rendering the latter resistive. This switches current in the BUSY flip-flop from the OFF to the ON lead in order to provide the appropriate indication to subsequent control pulses that the particular memory cell is no longer available for information storage. In those cells which do not have current flowing on the V lead, the busy control signal is blocked by the resistive state of the device 45, rendered resistive by a current on the $\overline{V}$ lead, so that the busy control signal current flows through the device 46 and bypasses the device 56.

Individual cell selection and readout processes in response to identification key signals applied from the memory module of the M register have already been described in connection with FIG. 2. As a result of the comparison process, current flows in the R lead of a memory cell encountering a true comparison with the applied identification key, thus indicating the selection of that cell to be read out, or in the $\overline{R}$ lead of a memory cell exhibiting a mismatch with the applied identification key. The current in the R lead is employed chiefly within the individual bit storage stages of the selected memory cell, as described in connection with FIG. 2, to assist in developing the appropriate readout indication in the O lead thereof. For memory cells exhibiting a mismatch, current in the $\overline{R}$ lead flows through the individual bit stages without any effect. In the control module portion of the memory cell as shown in FIG. 5 the respective currents on the R or $\overline{R}$ leads are employed in the memory cell clearing portion of the circuit. A particular cell is prepared for accepting the storage of succeeding information (in effect, "cleared" of previously stored information) by selecting that cell through the comparison process and then applying a clear command pulse to the $C_1$ lead in order to change the associated BUSY flip-flop from ON to OFF. Any number of such cells may be selected by the application of an identification key from the M register memory module, after which a clear command pulse is applied to the $C_1$ lead from the control module of the M register. In those cells which are not selected, current in the $\overline{R}$ lead renders the device 52 resistive so that a clear command pulse passes through the device 50 without producing any effect. However, in those cells which are selected in response to the identification key from the M registery memory module, current in the R lead renders the device 50 resistive so that the clear command pulse is directed through the device 52 and the control element of the device 54. This drives the device 54 resistive and switches current from the ON to the OFF lead of the BUSY flip-flop so that thereafter this memory cell provides an OFF response in the BUSY flip-flop, thereby indicating that the associated memory module is available for storage. It will be clear that the writing control current applied via the V lead automatically destroys the previous state of the storage circuits as it enables new information to be written therein. The device 49 is included in series with the R lead to block current therein for those memory cells exhibiting an OFF indication for the BUSY flip-flop, thus preventing an erroneous output from a cell having a BUSY flip-flop in the OFF condition but possibly still containing obsolete information corresponding to a particular applied identification key.

FIG. 6 is a schematic representation of a portion of the memory system of FIG. 1 showing a plurality of individual comparison and storage circuits similar to that of FIG. 2 in conjunction with corresponding control circuits as shown in FIG. 5 for three different memory cells. The operation of this circuit can readily be understood from the descriptions of the circuits of FIGS. 2 and 5. While the circuit of FIG. 6 is shown with only four individual bit handling stages in each memory cell, it will be understood that the memory cells may be readily extended to whatever capacity is desired simply by adding additional bit stages in series with those already shown. Similarly the circuit of FIG. 6 may be expanded to include a larger number of memory cells by adding additional cells to those shown.

FIG. 7 represents a portion of a memory cell in accordance with the invention and is similar to the circuit shown in FIG. 5 with the addition of circuitry to provide for the sequential readout of selected memory cells. A single memory circuit which is similar to the circuit of FIG. 2 is shown in FIG. 7. This portion of the circuit differs from that shown in FIG. 2 in that it is arranged for the control of currents on an additional pair of leads, the S and $\overline{S}$ leads.

To control the operation of the sequential readout circuit, pulses are applied alternately to the $K_1$ and $K_2$ leads from the control module of the M register. It will be understood that during the comparison process, a number of memory cells may be selected for readout in response to the application of a non-unique identification key from the memory module portion of the M register. In the selected cells, current flows in the S lead while in the unselected cells it flows in the $\overline{S}$ lead. Therefore, a first pulse applied to the $K_1$ lead encounters a resistive condition in the device 81 of the memory cell nearest the M register. This memory cell will then be the first one to be read out in response to the sequential control signals. Current in the $K_1$ lead, blocked by the device 81, is directed through the control element of the device 83 and through the device 82 to the $\overline{K_1}$ lead which serves as a return path for such current. For those cells following the nearest selected cell, current flows in the $\overline{K_1}$ lead and renders the device 84 resistive. For those cells which are nearer the M register than the first selected cell, current flows in the $K_1$ lead to drive the device 85 resistive. Therefore in all of the memory cells except the nearest selected cell, current is blocked from the R lead and is caused to flow in the $\overline{R}$ lead, thus preventing the readout of information from such cells. On the other hand, in the nearest selected cell, the device 83 is rendered resistive while the devices 84 and 85 are superconductive so that current is caused to flow in the R lead, thus providing for the readout of information from this particular cell. Following the application of a first signal to the $K_1$ lead, a second current pulse is applied to the $K_2$ lead which encounters a resistive device 86 in all cells except the nearest one selected for readout. The current in the $K_2$ lead thus passes through those memory cells without effect via the device 87. In the nearest selected cell, however, the current in the $K_2$ lead is blocked by the resistive condition of the device 87 and is caused to flow through the device 86 and through the control element of the device 88. This renders the device 88 resistive and switches the current in the S lead to the $\overline{S}$ lead, thus rendering the device 82 resistive so that a succeeding current pulse in the $K_1$ lead is directed through the memory cell which has just been read out and is passed on to the next selected memory cell. There the cycle of operation is repeated and the sequential readout of information from succeeding selected cells proceeds until the last selected cell has been read out.

Near the top of FIG. 7 a pair of devices 89 and 90 is shown arranged in an end-of-readout circuit to provide an indication when the last selected memory cell has been read out. So long as signals are received by this circuit over the $\overline{K_1}$ lead, which is the case when additional selected circuits remain to be read out, the device 90 is maintained resistive, thus blocking any current over the end-of-readout lead. When the last selected cell has been read out, however, the succeeding $K_1$ signal is passed to the end-of-readout circuit via the $K_1$ lead to drive the device 89 resistive while the device 90 is permitted to become superconductive. Current in the I lead is thus directed to the end-of-readout lead in order to signify that the readout sequence has been completed. It will be clear from a comparison of the circuits of FIGS. 7 and 5 that a plurality of memory cells such as that shown in FIG. 7 may be assembled in the manner of the arrangement of FIG. 6 in order to provide an information storage system of whatever capacity may be desired with the capability of sequential readout of selected information.

FIG. 8 is a diagrammatic illustration of an arrangement for maintaining the circuits of the present invention at a suitable low temperature near absolute zero. In FIG. 8 there is shown an exterior insulated container 92 which is adapted to hold a coolant such as liquid nitrogen. Within the container 92 an inner insulated container 93 is suspended for holding a second coolant, such as liquid helium, which maintains the circuits of the invention at the proper operating temperature. The top of the inner container 93 may be sealed by a sleeve 94 and lid 95 through which a conduit 96 connects the inner chamber 93 with a vacuum pump 98 via a pressure regulation valve 97. The pump serves to lower the atmospheric pressure within the chamber so as to control the temperature of the helium. The pressure regulation valve 97 functions to regulate the pressure within the chamber so that the temperature is held constant at a suitable low level. One or more circuits of the invention represented by the block 101 may be suspended in the liquid helium at the proper operating temperature at which the circuit components are superconducting. Connection to the circuits 101 may be made by lead-in wires such as 102 which also may be constructed of a superconductive material to minimize resistance. The lead-in wires 102 are shown extending through the lid 95 to a set of terminals 104.

By the practice of the invention, electrical circuits are provided of relatively small size which are capable of storing binary coded information and of producing an instantaneous voltage or a plurality of voltages representing the storage of particular information as desired. In accordance with the invention, the storage circuits shown are arranged to utilize simple gate devices of extremely small size and are arranged to function in improved fashion in response to applied control signals. Because of the small size and low power requirements of the circuits employed in the described arrangement, a large number of individual circuits may be grouped together to provide a memory system of extremely high capacity and high density for processing information therein. So long as the circuits of the invention are maintained at the proper temperature, information may be stored substantially indefinitely and may be read out repeatedly without requiring a regeneration of the information and without dissipation of electrical power within the storage circuits. In addition, due to the simplicity of construction of the circuits of the invention, a high reliability may be achieved.

Although exemplary embodiments of the invention have been illustrated and described hereinabove, it will be understood that the invention is not limited thereto. Accordingly, the accompanying claims are intended to include all equivalent arrangements falling within the scope of the invention.

What is claimed is:

1. A superconductive memory circuit comprising a gated persistor having a circulating current loop for information storage, means connected to the persistor for storing binary coded information in the form of a circulating current representing one binary digit and the absence of a circulating current representing the other binary digit, a superconductive device responsive to current in said persistor for performing a comparison between applied identification key signals and the stored circulating current state, the circulating current being in excess of the critical current value of the superconductive device, means for selectively limiting the current in the persistor loop to a value less than the critical current value of the superconductive device to prevent the performance of said comparison, and means for reading out stored information from the gated persistor.

2. An information storage system comprising a plurality of superconductive memory cells, each cell being divided into a control module and a memory module, means for storing binary coded information in the form of a circulating current representing one binary digit and the absence of current representing the other binary digit in the memory module of a selected memory cell, means for applying an identification key to all of the memory cells, means in each memory module for rejecting the associated memory cell in the event of a mismatch between the stored information state and the identification key, said rejecting means comprising means for selectively limiting the circulating current to a value less than the critical current value of the rejecting means during the application of the identification key, and readout circuitry for providing an indication of the information stored in any memory cell not rejected by said rejecting means.

3. A superconductive memory circuit comprising a gated persistor having a superconductive circulating current loop for information storage, means connected to the persistor for storing binary coded information in the form of a circulating current representing a binary "1" and the absence of a circulating current representing a binary "0," means for applying an identification key signal to the persistor, means for comparing the applied identification key signal with the stored information state in order to select the circuit if a true comparison exists, means for selectively limiting the identification key signal to an intermediate level between the binary "1" and binary "0" magnitudes in order to select the circuit regardless of the stored information state, and means connected to the gated persistor for indicating the stored information state of a selected circuit.

4. A combination according to claim 3 which includes a superconductive device controllable by current in a portion of the persistor loop for providing a comparison between a stored information state and an identification key signal applied to the circuit, the circulating current for the binary "1" having a value of approximately four-thirds the critical current value for said superconductive device, and means for selectively establishing a current in the portion of the persistor loop associated with said superconductive device that is equal to approximately two-thirds the critical current value thereof in order to inhibit the comparison between a stored information state and an applied identification key signal.

References Cited by the Examiner

UNITED STATES PATENTS 3,001,178 9/61 Buck ---------------- 340—173.1

FOREIGN PATENTS 634,051 1/62 Canada.

OTHER REFERENCES

Pages 120–122, 4/61, publication, "Associative Memory," by Rosin IBM Tech. Dis. Bul., vol. 3, No. 10.

IRVING L. SRAGOW, *Primary Examiner.*